3,646,130
CATALYTIC OXIDATION OF CYCLODODECENE TO 1,12-DODECANEDIOIC ACID

George William Parshall, Wilmington, Del., assignor to E. I. du Pont de Nemours and Company, Wilmington, Del.
No Drawing. Filed May 15, 1970, Ser. No. 37,928
Int. Cl. C07c 55/02
U.S. Cl. 260—533 C     7 Claims

ABSTRACT OF THE DISCLOSURE 1,12-dodecanedioic acid, which is a useful starting material for the preparation of fiber-forming polycarbonamides, of plasticizers, and of polyesters, is prepared by the oxidation of cyclododecene with hydrogen peroxide in the presence of rhenium heptoxide catalyst and of a lower carboxylic acid.

BACKGROUND OF THE INVENTION

Field of the invention

This invention relates to a process for the oxidation of cyclododecene to 1,12-dodecanedioic acid.

Prior art

Wilhoit U.S. Pat. 3,461,160 shows the oxidation of cyclododecene to 1,12-dodecanedioic acid by the action of aqueous nitric acid and an osmium/vanadium catalyst. While this process provides greatly improved yields over previous methods for carrying out this oxidation, the catalyst is quite expensive. In addition, osmium tetroxide suffers from the drawback that it is readily lost by volatilization from acidic systems.

SUMMARY OF THE INVENTION

According to this invention, it has now been discovered that cyclododecene can be readily oxidized to 1,12-dodecanedioic acid by contacting cyclododecene with hydrogen peroxide in the presence of a $C_1$–$C_6$ carboxylic acid and rhenium heptoxide catalyst, as shown in the equation below:

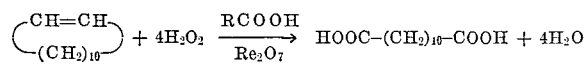

DETAILED DESCRIPTION

In the process of this invention, the carboxylic acid is believed to be primarily a suitable reaction medium in which all the components are soluble, and the catalytic oxidation of cyclododecene with hydrogen peroxide takes place with good efficiency.

Suitable carboxylic acids are lower alkanoic acids RCOOH, in which R is an alkyl group of 1–5 carbon atoms. Representative lower alkanoic acids include acetic acid, propionic acid, butyric acid, isobutyric acid, pentanoic acid, hexanoic acid, and the like. Because of its ready availability, acetic acid is preferred. Mixtures of two or more acids can be used.

The process is operable in the presence of large proportions of water. However, best yields are obtained when the amount of water in the system is kept below 20% of the weight of the carboxylic acid present. Since water is formed in the reaction, and additional water is usually introduced with hydrogen peroxide, the proportion of water increases during the reaction. To keep the amount of water below 20% of the weight of the carboxylic acid, it is convenient to add to the reaction mixture sufficient amounts of a $C_1$–$C_6$ carboxylic acid anhydride to absorb that excess of water by converting the anhydride to the corresponding carboxylic acid. While the usual commercial form of hydrogen peroxide is a 30% aqueous solution (w./w.), more concentrated solutions (e.g., 50–70%) also can be used; while more dilute concentrations (e.g., 15%) also are operable.

The active catalyst in this reaction is rhenium heptoxide. It can be added as such or it can be generated in situ by adding rhenium metal or any of the lower rhenium oxides, since these are rapidly converted to rhenium heptoxide by the hydrogen peroxide present in the system. The amount of rhenium heptoxide catalyst can be varied within broad limits. For example, amounts ranging from 0.01% to 10% of the weight of the cyclododecene employed can be used.

Rhenium heptoxide is soluble in the reaction mixture and this process is, therefore, carried out in a homogeneous liquid phase. Since at low carboxylic acid:starting cyclododecene molar ratios added water may produce a separate liquid phase, it is advisable to have initially at least an equimolar proportion of each component, and the range of about 3:1 to 30:1 is considered practical. However, the process can be operated with molar ratios of carboxylic acid to the starting cyclododecene as high as about 50:1. In the presence of water, rhenium heptoxide is converted to perrhenic acid, $HReO_4$, which also is soluble in the reaction medium.

The molar proportions of hydrogen peroxide to cyclododecene can also be varied widely. For example, molar ratios from 100:1 to 1:100, respectively, can be used. However, best results are obtained with the stoichiometric amount of hydrogen peroxide, i.e., 4 moles per mole of the starting cyclododecene. The practical operating molar ratios are about 20:1 to equimolar.

The process of this invention can be carried out at temperatures within the range of about $-10°$ C. to $+250°$ C. The range from $0$–$150°$ C. is preferred. It is particularly convenient to introduce the hydrogen peroxide at a temperature within the range of about $0$–$50°$ C. and then complete the reaction at about $50$–$150°$ C. This latter procedure is particularly well adapted for continuous operation in a tubular reactor, where the reaction mixture is moved from one temperature-controlled reaction zone to another.

Pressure is not a critical factor in the reaction and pressures both above and below atmospheric pressure can be employed. Atmospheric pressure is preferred for convenience.

The reaction time can be varied widely, depending on the temperature employed. Thus, it can vary from about five seconds to 24 hours or more.

The 1,12-dodecanedioic acid product can be recovered by known methods, such as distillation, extraction, recrystallization, chromatography, and the like.

Rhenium heptoxide catalyst is less expensive than an osmium catalyst, such as osmium tetroxide. In addition, rhenium heptoxide does not readily volatilize from the reaction medium.

This invention is now illustrated by representative examples of certain preferred embodiments thereof, wherein all parts, proportions and percentages are by weight unless otherwise specified.

EXAMPLE 1

Addition of 8.3 g. of cyclododecene to a solution of 0.48 g. of $Re_2O_7$ in 50 ml. of acetic acid gave a deep red color. Hydrogen peroxide (25 g. of a 30% aqueous solution) was added at a rate to partially discharge the color (about 10 min.). The mixture was then boiled for one hour and was diluted with 300 ml. of water. The water was washed four times with 50 ml. of ether and the ether was dried over $MgSO_4$. Distillation to a pot temperature of 95° C. at 0.3 mm. left an oily, partly solid residue. The residue was extracted with ether, leaving 0.31 g. of white solid, M.P. 129–130° C.

The ether layer was extracted with a 5% aqueous NaHCO₃ solution. Acidification of the extract gave an additional amount of 1.2 g. of white solid having an infrared spectrum virtually identical to that of the first crop and to that of 1,12-dodecanedioic acid. The identity of the material as 1,12-dodecanedioic acid was also established by mixture melting point (128–130.5° C.) with an authentic sample.

*Analysis.*—Calcd. for $C_{12}H_{22}O_4$ (percent): C, 62.58; H, 9.63. Found (percent): C, 62.77, 62.70; H, 10.06, 9.69.

EXAMPLE 2

The reaction of cyclododecene with hydrogen peroxide was carried out substantially as described in Example 1, except that the hydrogen peroxide was added during 20 minutes. After cooling and dilution of the reaction mixture, the water-insoluble products were distilled at 0.5 mm. until the pot temperature reached 130° C. Some crystalline solid, M.P. 40–42° C., collected in the condenser of the still (cyclododecane impurity in the original cyclododecene). The nonvolatile residue was extracted with 5% sodium bicarbonate solution. Acidification of the extract with HCl gave 0.78 g. of 1,12-dodecanedioic acid as a white precipitate. The oil, which was insoluble in sodium bicarbonate, partially crystallized and, after purification, was identified as cyclododecane-cis-1,2-diol, M.P. 158–159° C., reported by Prelog and Speck, Helv. Chim. Acta 38, 1786 (1955).

EXAMPLE 3

To a reaction mixture containing 20 ml. of cyclododecene (92% purity), 100 ml. of glacial acetic acid and 1.0 g. of rhenium heptoxide, there was added at 25° C. with stirring, 50 g. of hydrogen peroxide (30% in water) over a period of about 20 minutes. The resulting mixture was stirred for 1 hour at 25° C. and then heated with stirring at reflux for about 5 hours. The product was recovered as in the previous examples and gave a 30% yield of 1,12-dodecanedioic acid. In a control run, otherwise identical except that rhenium heptoxide was omitted, the yield of 1,12-dodecanedioic acid was only 2%.

1,12-dodecanedioic acid is useful as an intermediate for preparing polyester and polyamide resins. It also can be esterified to yield high boiling esters which are suitable as plasticizers for thermoplastic resins. Use of 1,12-dodecanedioic acid in the preparation of fiber-forming, polycarbonamides is disclosed, for example, in U.S. Pat. 3,393,210 (to Speck).

The embodiments of the invention in which an exclusive property or privilage is claimed are defined as follows:

1. A process for oxidizing cyclododecene to 1,12-dodecanedioic acid, said process comprising the step of contacting cyclododecene with about 1–20 moles of hydrogen peroxide per mole of the starting cyclododecene in the presence of about 0.01–10 weight percent of rhenium heptoxide, based on the weight of the starting cyclododecene, and of 1–50 moles of at least one $C_1$–$C_6$ alkanoic acid per mole of the starting cyclododecene at a temperature within the range of about −10° C. to 250° C.

2. The process of claim 1 wherein the temperature is maintained at about 0–150° C.

3. The process of claim 1 wherein the alkanoic acid is acetic acid.

4. The process of claim 1 wherein the molar ratio of the carboxylic acid to the starting cyclododecene is within the range of about 3:1 to 30:1.

5. The process of claim 1 wherein the amount of hydrogen peroxide is about stoichiometric.

6. The process of claim 1 wherein, in addition, water is present in an amount of up to about 20 weight percent, based on the amount of the carboxylic acid.

7. The process of claim 6 wherein the amount of water present in the reacting mixture is controlled by addition of a $C_1$–$C_6$ alkanoic acid anhydride.

References Cited

UNITED STATES PATENTS

| | | | |
|---|---|---|---|
| 3,284,492 | 11/1966 | Fremery et al. | 260—533 C |
| 3,393,225 | 7/1968 | Fenton | 260—497 R X |
| 3,441,604 | 4/1969 | Baylis et al. | 260—533 C X |

LORRAINE A. WEINBERGER, Primary Examiner

R. O. KELLY, Assistant Examiner